United States Patent [19]

Gonsalves et al.

[11] Patent Number: 5,077,076
[45] Date of Patent: Dec. 31, 1991

[54] LOW-FAT FROZEN WHIPPED TOPPING AND PROCESS THEREFORE

[75] Inventors: Alexander A. Gonsalves, Libertyville, Ill.; Barbara M. Taylor, Montvale, N.J.; Jay M. DeBenedict; Richard J. Thomas, both of Hamilton Square, N.J.

[73] Assignee: Kraft General Foods, Inc., Glenview, Ill.

[21] Appl. No.: 693,043

[22] Filed: Apr. 29, 1991

Related U.S. Application Data

[63] Continuation of Ser. No. 540,421, Jun. 15, 1990, abandoned.

[51] Int. Cl.$^5$ .............................................. A23G 9/00
[52] U.S. Cl. .................................... 426/565; 426/566; 426/567; 426/570; 426/804
[58] Field of Search ............... 426/564, 565, 566, 567, 426/570, 569, 804

[56] References Cited

U.S. PATENT DOCUMENTS

| | | | |
|---|---|---|---|
| 3,350,209 | 10/1967 | Rodgers et al. | 426/576 |
| 3,353,965 | 11/1967 | Patterson | 426/570 |
| 3,968,267 | 7/1976 | Ogasa et al. | 426/570 |
| 4,251,560 | 2/1981 | Dell et al. | 426/570 |
| 4,451,492 | 5/1984 | Dell et al. | 426/570 |
| 4,505,943 | 3/1985 | Dell et al. | 426/57 |

*Primary Examiner*—Jeanette Hunter
*Attorney, Agent, or Firm*—Thomas R. Savoie

[57] ABSTRACT

A frozen topping having excellent texture and stability is prepared having a fat level of from 5 to 15%, an overrun of at least 250% and a solids level of 38% to 43%. The topping contains 2.5 to 7% non-fat milk solids, 0.03 to 0.15% phosphate salts, 0.5 to 2% sodium caseinate, 0.15 to 0.6 emulsifiers and 15 to 25% water-soluble carbohydrates. The ratio of phosphate salts to non-fat milk solids is from 1:60 to 1:120.

11 Claims, No Drawings

LOW-FAT FROZEN WHIPPED TOPPING AND PROCESS THEREFORE

This application is a continuation of application Ser. No. 540,421, filed Jun. 15, 1990 now abandoned.

BACKGROUND OF THE INVENTION

1. Field of the Invention

This invention relates to a formulation and process for producing a low-fat, low-calorie, frozen whipped topping which will be freeze-thaw stable and which will retain a stable foam structure and texture after twenty-one days of refrigerator (40° F.) storage.

2. Description of the Prior Art

Compositions and processes for preparing either dairy or non-dairy frozen whipped toppings are known in the art. U.S. Pat. Nos. 3,431,717 to Lorant, 4,411,926 to Trumbetas et al., 4,251,560, 4,451,452 and 4,505,943 to Dell et al., and 4,478,867 to Zobel et al. relate to such compositions and processes. The disclosures of these patents enable the production of freeze-thaw stable, frozen whipped toppings which are distributed as frozen products, which are thawed prior to use, and which can be stored in the refrigerator for up to 21 days without textural breakdown. The teachings of this prior art however only enable production of such frozen whipped toppings when the fat content of the topping is about 20% or more. If the fat content of these prior art frozen toppings is reduced to a level of 15% or below the stability of the foam is adversely affected both in terms of reduced freeze-thaw stability and reduced stability of the thawed, foam structure and texture during 21 days of refrigerator storage.

SUMMARY OF THE INVENTION

This invention enables the production of a frozen whipped topping which has a low fat content of from 5 to 15% by weight, an overrun in excess of 250% and a caloric density of less than 0.65 calories per cubic centimeter and which is both freeze-thaw stable and refrigerator stable for up to 21 days. This invention is based on the finding that to obtain the foregoing objectives critical weight levels and combinations of ingredients are required.

Specifically the formulation must include milk solids non-fat at a level from 2.5 to 7% and phosphate salts at a level of from 0.03 to 0.15%, with the ratio of phosphate salts to milk solids non-fat being from 1:60 to 1:120. Further, a level of sodium caseinate of from 0.5 to 2% and a level of emulsifiers of from 0.15 to 0.6% is required along with a emulsifier to sodium caseinate ratio of from 1 to 3.4 to 1:4.

A level of gums of from 0.05 to 1% and a level of sugars and/or water-soluble, carbohydrates of from 15 to 25% are likewise needed. At least 25% of the carbohydrates included in the formulation, not including any such materials contained in the milk solids non-fat component, must be tri- or higher saccharides. In order to obtain the functionality sought for the frozen whipped toppings of this invention the solids level of the formulation must be 38 to 43%.

The various ingredient and formulation limitations recited above combine to enable the production of the desired frozen whipped topping. All percents and ratios set forth in this disclosure are, unless otherwise stated, on a weight basis.

DETAILED DESCRIPTION OF THE INVENTION

Frozen whipped toppings which are intended to have a lower caloric density, as compared to current commercial products, require a low fat level and a low solids level. Such low-calorie toppings which have good texture and which are able to retain a high overrun, on the order of 300%, freeze-thaw stability and refrigerator storage stability for 21 days have not previously been available. It has been found that as the fat level of frozen whipped toppings is reduced to a level below about 20% and the solids content reduced below about 46% it becomes increasingly difficult to produce a frozen whipped topping having the requisite stability. Cool Whip ® brand topping, a non-dairy frozen whipped topping which as gained wide acceptance in the U.S. market because of its excellent texture and stability, has a caloric density of at least 0.76 calories per cubic centimeter together with an overrun of 300%, a fat level of 20% and a solids level of 46.1%.

By practicing the teachings of this invention it is possible to produce a freeze-thaw stable and refrigerator stable frozen whipped topping which has excellent texture, an overrun in excess of 250%, a fat level of less than 15%, a solids level of less than 43% and a caloric density of less than 0.65, preferably less than 0.61, calories/cc. This invention identifies various compositional limitations which are critical to the production of the desired frozen whipped topping.

Non-fat milk solids are required at a level of 2.5 to 7.0%, preferably 4.0 to 6.0% and phosphate salts are required at a level of 0.03 to 0.15%, preferably 0.04 to 0.1%. The inclusion of non-fat dry milk solids and phosphate salts are believed to be necessary to obtain the desired whipability and stability. Milk solids need to be kept below 7% in order to control costs, solids level and caloric density of the product. The phosphate salts are thought to interact with milk proteins and assist in providing structure to the foam. The ratio of phosphate salts to non-fat milk solids must be from 1:60 to 1:120, preferably 1:80 to 1:100. The phosphate salts are preferably the alkali metal phosphates, pyrophosphates, metaphosphates and polyphosphates with $pK_a$ between about 2 and about 9. Most preferably the salt will be a potassium or sodium salt, or mixture thereof, typically selected from the group consisting of monosodium phosphate, monopotassium phosphate, disodium phosphate, dipotassium phosphate, tetrasodium pyrophosphate, tetrapotassium pyrophosphate and combinations thereof. A combination of disodium phosphate and tetrasodium pyrophosphate at about a 1:1 ratio has proven to be useful in this invention.

Hydrocolloid stabilizing agents, such as polysaccharide gums, are also required in the formulations of this invention at a level of from 0.05 to 1%, preferably 0.1 to 0.3%. These stabilizers are also believed to assist in providing structure to the foam, improving the mouthfeel of the product and preventing syneresis. Vegetable or synthetic gums such as carrageenan, xanthan, guar, locust bean, alginate and the like, or carboxymethylcellulose, methylcellulose ether and the like, and mixtures thereof should be useful in this invention. A combination of xanthan gum and a galactomannan gum, such as locust bean gum and/or guar gum at about a 2:1 ratio has proven to be useful in this invention.

Sodium caseinate is included in the formulation together with emulsifying agents (i.e., chemical emulsifiers). Although it is known that sodium caseinate can function as an emulsifier, the identification of critical levels and ratios which enable the production of low-fat, low-solids frozen whipped toppings is a critical element of this invention. It has been found, that if the level of emulsification is too high, the foam will lack refrigerator storage stability as evidenced by a coalescing of air cells and the development of a webby texture. If the level of emulsification is too low then the formulation does not whip to a desirable firm texture and the product will have poor stability. The level of sodium caseinate must be from 0.5 to 2%, preferably 0.8 to 1.5% and the level of emulsifying agents must be from 0.15 to 0.6%, preferably 0.2 to 0.4%. Further, the ratio of emulsifiers to sodium caseinate must be from 1:3.4 to 1:4. The level of emulsifying agents to fat should be at least 2 parts emulsifying agents for each 100 parts fat. The level of sodium caseinate to fat should be at least 6.5, preferably at least 7.5 parts sodium caseinate for each 100 parts fat.

The fat used in the formulation of this invention are preferably the vegetable fats or oils commonly employed in frozen whipped toppings. Such fats or oils may be fully or partially hydrogenated. Hydrogenated oils, such as coconut and palm kernel oil, have typically been used in the production of frozen whipped toppings. Animal fats such as milk fat would be functional in the formulation of this invention, but the use of animal fats in low calorie products is not common and is preferably avoided. Partially hydrogenated vegetable oils such as cottonseed, peanut, olive, corn, soy or the like could be useful for use in this invention.

Among the emulsifying agents which may be useful in this invention are: the monoglycerides of fatty acids, such as monostearin; polyoxyalkylene ethers of fatty esters of polyhydric alcolols, such as the polyoxyethylene ethers of sorbitan monostearate (i.e., polysorbate 60); fatty esters of polyhydric alcohols, such as sorbitan monostearate; esters of glycol and fatty acids, such as propylene glycol monostearate; partial esters of carboxylic acids with glycerides of fatty acids, such as glyceryl lactopalmitate; and polyglycerol esters of fatty acids. Preferably a combination of emulsifying agents is employed; polysorbate 60 and sorbitan monostearate at about a 2-3:1 ratio has proven to be useful in this invention.

Water-soluble carbohydrates are employed in the formulation at a level of from 15 to 25% to supply solids and sweetness. Mono and disaccharides (e.g., dextrose, sucrose, fructose) may be included in the formulation to provide the desired sweetness. The formulations of this invention also require the presence of tri- or higher saccharides which appear to improve the stability of the product. Specifically, at least 25%, preferably at least 30%, of these saccharides are tri- or higher saccharides. Typically, these higher saccharides will be added in the form of sugar syrups; however, the addition of maltodextrins or other hydrolyzed starch solids would be possible.

Various flavors, colors or nutritional ingriedents may be added in minor amounts in order to produce a commercially-acceptable product.

The frozen whipped topping of this invention may be prepared generally in accordance with the process set forth in the U.S. Pat. Nos. 4,478,867 to Zobel et al. and 3,431,117 to Lorant both of which are hereby incorporated by reference. Accordingly, the ingredients are batched and the formulation is pasteurized and then homogenized at a pressure of at least 6,000 psi. The homogenized mixture is cooled in a heat exchanger down to about 40° F. and then held for at least 45 minutes in order to permit the fat to crystalize and apparently to allow for a rearrangement of protein and emulsifying agents. The resulting emuslion is then aerated in a continuous mixer having a mixing pressure of from about 45 to 100 psig and a mixing temperature of from about 30 to about 50° F.

The emulsion is aerated by incorporating air or an inert gas such as nitrogen or carbon dioxide in an amount sufficient to produce an overrun in the final product of from 250 to 350%, preferably about 300%. The pressure of the aerated emulsion is then reduced by about 10 to 50 psig in a continuous and gradual manner by conventional means, such as conveying the emulsion through one or more tubes or pipes having a diameter and length sufficient to effect the desired pressure reduction. Preferably this pressure reduction steps occurs over a period of at least 5 seconds in order to permit equilibration of air cells.

The pressure-reduced emulsion is then whipped. Whipping may be done in an open mixer, such as a Hobart ® mixer, but preferably is done in a closed vessel, such as a jacketed, scraped-surface heat exchanger. According to a preferred embodiment, whipping is done at a pressure of about 20 to about 70 psig and a temperature of about 50 to about 60° F. The closed vessel may, in fact, be comprised of a plurality of connected heat exchangers in order to better control the temperature of the emulsion during whipping As noted in the Zobel et al. patent the amount of shear employed during the whipping step is controlled in order to produce a product with the desired texture.

After the product has been whipped to the desired extent, the pressure is then reduced to atmospheric pressure in a gradual and continuous manner. This pressure reduction may also be effected by means of a length of pipe or tubing having the appropriate diameter and length. Upon reaching atmospheric pressure, the temperature of the whipped emulsion should be from about 55° to 60° F. In typical plant operation the whipped emulsion is passed to a filler, packaged in containers for retail sale and frozen at 0° F. or below.

The following example further illustrates various features of this invention but is not intended to in any way limit the scope of the invention, which is defined in the appended claims.

| Ingredient | Weight % |
|---|---|
| Water | 54.65 |
| Hydrogenated Coconut/ Palm Kernel Oil | 13.00 |
| Corn Syrup (42DE, 80% solids) | 14.09 |
| High Fructose Corn Syrup (42% conversion, 71% solids) | 5.50 |
| Sucrose | 5.35 |
| NFDMS | 5.40 |
| Sodium Caseinate | 1.10 |
| Emulsifying Agents | 0.30 |
| Vegetable Gums | 0.17 |
| Flavors & Colors | 0.38 |
| Phosphate Salts | 0.06 |

The phosphates were dissolved in 100° F. batch water and the fat was added The temperature of the mixture was raised to 130° F. and emulsifying agents and gums were added. Thereafter the remaining ingredients were added. The resulting mixture, which had a solids level of 40.5%, was pasteurized at 160° F. for 15 minutes, homogenized in a two stage homogenizer at 8000 psig first stage and 600 psig second stage. The resulting emulsion was cooled to 42°-43° F. and held at this temperature under agitation for at least 60 minutes. The emulsion was then fed to a continuous recycle mixer where sufficient air was introduced in order to produce an overrun of 300% in the final product. The pressure in the mixer was about 70 psig. The emulsion exited the mixer at 49°-50° F. and was fed through a 29 foot length of one-inch pipe at a flow rate of 65 pounds per minute. The residence time through this pipe was approximately 10 seconds and the exit pressure was about 32 psig. The emulsion was then passed through a series of four, cooled, scraped-surface heat exchangers where it is whipped at temperatures ranging from 54° to 59° F. The pressure on the whipped emulsion is reduced to atmospheric by passage through a 21.25 foot length of 2.5 inch piping and a 8.75 foot length of 2 inch piping. The final aerated whipped emulsion had a temperature of 60° F. The product was put in containers and frozen to a temperature of 0° F. The product, which had a caloric density of less than 0.61 calories/cc, was judged to be freeze-thaw stable and the thawed product was judged to have high-quality flavor, texture and overrun, comparable to Non-Dairy Cool Whip ® Frozen Whipped Topping, even after 21 days of refrigerator storage (40° F.)

Having thus described the invention, what is claimed is:

1. A low-fat, refrigerator-stable, frozen, whipped topping having an overrun in excess of 250% and a caloric density of less than 0.65 calories/cc comprising on a weight basis from 5 to 15% fat, from 2.5 to 7.0% non-fat milk solids, from 0.15 to 0.15% phosphate salts with the ratio of phospate salts to milk solids non-fat being from 1:60 to 1:120, from 0.05 to 1.0% gums, from 0.5 to 2% sodium caseinate, from 0.15 to 0.6% emulsifying agents from 15 to 25% water-soluble carbohydrates with at least 25% of said water-soluble carbohydrates being tri- or higher saccharides, and wherein the solids content is from 38 to 43%.

2. The topping of claim 1 wherein the phosphate salts consist of disodium phosphate and tetrasodium phosphate.

3. The topping of claim 1 wherein the emulsifying agents consist of sorbitan monostearate and polysorbate 60.

4. The topping of claim 1 wherein the gums consist of xanthan gum and galactomannan gum.

5. The topping of claim 1 which is processed by being pasteurized, homogenized and cooled and then held at 42° to 43° F., in an agitated state, for at least 45 minutes prior to aerating, whipping and freezing.

6. The topping of claim 5 wherein, after having been pasteurized, homogenized, cooled, and then held in an agitated state, the topping is aerated in a continuous mixer at a pressure of from 45-100 psig, the resulting aerated emulsion is held without whipping for a time period of at least 5 seconds at from 49°-50° F. and effective to permit air cells to equilibrate, before being passed through a plurality of scraped-surface heat exchangers in which the topping is whipped at a pressure which is from 10 to 50 psig lower than the pressure in the continuous mixer.

7. The topping of claim 6 wherein the time period the aerated topping is held before whipping is at least 5 seconds.

8. The topping of claim 1 wherein the ratio of emulsifying agents to sodium caseinate is from 1:3.4 to 1:4.

9. The topping of claim 8 wherein the ratio of emulsifying agents to fat is at least 2 parts emulsifying agents for each 100 parts fat.

10. The topping of claim 9 wherein the ratio of sodium caseinate to fat is at least 6.5 parts sodium caseinate for each 100 parts fat.

11. The topping of claim 1 wherein the phosphate salt level is 0.03%.

* * * * *